United States Patent
Chai et al.

(10) Patent No.: US 10,063,930 B2
(45) Date of Patent: *Aug. 28, 2018

(54) APPARATUS AND METHOD FOR EPG SORTING AND AUTOMATIC REALIGNMENT

(71) Applicant: OpenTV, inc., San Francisco, CA (US)

(72) Inventors: Crx K. Chai, Oakland, CA (US); Alex Fishman, San Francisco, CA (US); Matthew Huntington, Twickenham (GB); Isaac Chellin, San Francisco, CA (US); Kevin Lu, San Francisco, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,002

(22) Filed: Apr. 15, 2016

(65) Prior Publication Data

US 2016/0234561 A1 Aug. 11, 2016

Related U.S. Application Data

(63) Continuation of application No. 14/664,748, filed on Mar. 20, 2015, now Pat. No. 9,319,747, which is a
(Continued)

(30) Foreign Application Priority Data

Nov. 9, 2011 (EP) ..................................... 11188362

(51) Int. Cl.
*H04N 5/445* (2011.01)
*H04N 21/482* (2011.01)
(Continued)

(52) U.S. Cl.
CPC ..... *H04N 21/4821* (2013.01); *H04N 5/44543* (2013.01); *H04N 21/4314* (2013.01); *H04N 21/47205* (2013.01); *H04N 21/4858* (2013.01)

(58) Field of Classification Search
CPC ............. H04N 21/4312; H04N 21/431; H04N 21/482; H04N 21/4828; H04N 21/4821
See application file for complete search history.

(56) References Cited

U.S. PATENT DOCUMENTS 5,808,608 A * 9/1998 Young ................... G04G 15/006
348/563
5,892,498 A * 4/1999 Marshall ............ H04N 5/44543
345/684

(Continued)

FOREIGN PATENT DOCUMENTS

| AU | 2012304456 | 7/2017 |
|---|---|---|
| CN | 103930849 A | 7/2014 |

(Continued)

OTHER PUBLICATIONS

"U.S. Appl. No. 13/605,672, Final Office Action dated Aug. 13, 2014", 13 pgs.
(Continued)

*Primary Examiner* — Pankaj Kumar
*Assistant Examiner* — Timothy R Newlin
(74) *Attorney, Agent, or Firm* — Schwegman Lundberg & Woessner, P.A.

(57) ABSTRACT

In various example embodiments, a system and method for electronic program guide (EPG) sorting and automatic realignment is provided. In example embodiments, a graphical user interface having an EPG including a plurality of rows of thumbnails representing programs is presented on a device of a user. Each row of thumbnails may be navigated independent of other rows. A navigational input is received via a touchscreen of the device. The navigational input
(Continued)

indicates an action performed on the graphical user interface that triggers a realignment of programming information presented on the EPG. An updated EPG with the realignment of the programming information indicated by the navigational input is then provided.

20 Claims, 13 Drawing Sheets

Related U.S. Application Data continuation of application No. 13/605,672, filed on Sep. 6, 2012, now Pat. No. 8,997,151.

(60) Provisional application No. 61/531,621, filed on Sep. 7, 2011.

(51) Int. Cl.
*H04N 21/431* (2011.01)
*H04N 21/472* (2011.01)
*H04N 21/485* (2011.01)

(56) References Cited

U.S. PATENT DOCUMENTS

| | | | | |
|---|---|---|---|---|
| 5,943,051 A * | 8/1999 | Onda | G06F 3/0334 | 345/661 |
| 6,246,442 B1 * | 6/2001 | Harada | G06F 17/211 | 348/563 |
| 6,344,880 B1 * | 2/2002 | Takahashi | H04N 5/44543 | 348/563 |
| 6,359,636 B1 * | 3/2002 | Schindler | G06F 3/0481 | 348/E7.071 |
| 6,466,241 B1 | 10/2002 | Schindler | | |
| 6,694,514 B1 * | 2/2004 | Dobbelaar | H04N 5/44543 | 348/563 |
| 6,721,953 B1 | 4/2004 | Bates et al. | | |
| 7,353,462 B2 * | 4/2008 | Caffarelli | G06F 3/0481 | 348/E5.104 |
| 7,650,618 B2 * | 1/2010 | Swix | H04N 5/44543 | 725/37 |
| 7,672,944 B1 * | 3/2010 | Holladay | G06F 17/30486 | 707/999.007 |
| 7,900,228 B2 * | 3/2011 | Stark | H04N 5/44543 | 348/563 |
| 8,042,063 B1 * | 10/2011 | Lin-Hendel | G06F 3/0482 | 715/805 |
| 8,194,099 B2 * | 6/2012 | Ubillos | G06F 3/0481 | 345/619 |
| 8,239,894 B2 * | 8/2012 | Utsuki | H04N 5/44591 | 715/700 |
| 8,321,799 B1 * | 11/2012 | Simonson | G06F 3/0482 | 715/764 |
| 8,997,151 B2 | 3/2015 | Chai et al. | | |
| 9,319,747 B2 | 4/2016 | Chai et al. | | |
| 2002/0016963 A1 | 2/2002 | Inoue et al. | | |
| 2002/0038457 A1 * | 3/2002 | Numata | H04N 5/44543 | 725/47 |
| 2003/0014752 A1 * | 1/2003 | Zaslavsky | H04N 21/4316 | 725/40 |
| 2004/0095379 A1 | 5/2004 | Chang et al. | | |
| 2004/0100479 A1 * | 5/2004 | Nakano | G06F 1/1626 | 715/700 |
| 2005/0010955 A1 * | 1/2005 | Elia | G06F 3/0482 | 725/88 |
| 2006/0020970 A1 * | 1/2006 | Utsuki | H04N 5/44591 | 725/39 |
| 2006/0024021 A1 * | 2/2006 | Utsuki | H04N 5/44543 | 386/230 |
| 2006/0271959 A1 | 11/2006 | Jacoby et al. | | |
| 2007/0094611 A1 * | 4/2007 | Sasaki | G06F 17/30274 | 715/804 |
| 2007/0101364 A1 * | 5/2007 | Morita | G06F 3/04817 | 725/38 |
| 2008/0052742 A1 * | 2/2008 | Kopf | H04N 5/44591 | 725/34 |
| 2008/0155458 A1 * | 6/2008 | Fagans | G06F 3/04817 | 715/781 |
| 2008/0155462 A1 * | 6/2008 | Nilakantan | G06F 3/04855 | 715/786 |
| 2008/0155475 A1 * | 6/2008 | Duhig | G06F 3/0482 | 715/830 |
| 2008/0235592 A1 * | 9/2008 | Trauth | G06F 3/0482 | 715/733 |
| 2008/0235737 A1 * | 9/2008 | Read | H04N 5/44591 | 725/52 |
| 2008/0320391 A1 * | 12/2008 | Lemay | G06F 3/04886 | 715/702 |
| 2009/0064230 A1 | 3/2009 | Hung | | |
| 2009/0100469 A1 | 4/2009 | Conradt et al. | | |
| 2009/0133063 A1 * | 5/2009 | Sparrell | H04N 5/44543 | 725/40 |
| 2009/0150775 A1 * | 6/2009 | Miyazaki | G06F 3/041 | 715/702 |
| 2009/0164489 A1 * | 6/2009 | Matsuda | G06K 9/6217 | |
| 2009/0178078 A1 * | 7/2009 | Daigle | H04N 5/44543 | 725/40 |
| 2009/0207184 A1 * | 8/2009 | Laine | G06F 1/1626 | 345/619 |
| 2010/0131984 A1 * | 5/2010 | Kim | H04N 5/4403 | 725/47 |
| 2010/0245680 A1 * | 9/2010 | Tsukada | H04N 5/4403 | 348/734 |
| 2010/0251167 A1 * | 9/2010 | DeLuca | G06F 3/0485 | 715/786 |
| 2010/0277496 A1 * | 11/2010 | Kawanishi | G06F 3/0485 | 345/589 |
| 2010/0306798 A1 * | 12/2010 | Ahn | H04N 5/445 | 725/38 |
| 2011/0167385 A1 | 7/2011 | Charrue et al. | | |
| 2011/0252447 A1 * | 10/2011 | Suzuki | H04N 5/76 | 725/41 |
| 2011/0317192 A1 * | 12/2011 | Fukuoka | G06F 3/0482 | 358/1.13 |
| 2012/0011476 A1 * | 1/2012 | Ou | G06F 3/0482 | 715/863 |
| 2013/0061266 A1 | 3/2013 | Chai et al. | | |
| 2013/0139200 A1 * | 5/2013 | Mountain | H04N 21/4312 | 725/41 |
| 2014/0038709 A1 * | 2/2014 | Earley | G07F 17/323 | 463/31 |
| 2014/0136980 A1 * | 5/2014 | Mate | H04L 65/4084 | 715/723 |
| 2015/0195623 A1 | 7/2015 | Chai et al. | | |

FOREIGN PATENT DOCUMENTS

| | | |
|---|---|---|
| EP | 2302915 A2 | 3/2011 |
| WO | WO-2008085744 A1 | 7/2008 |
| WO | WO-2013036792 A1 | 3/2013 |

OTHER PUBLICATIONS

"U.S. Appl. No. 13/605,672, Non Final Office Action dated Nov. 29, 2013", 15 pgs.
"U.S. Appl. No. 13/605,672, Notice of Allowance dated Nov. 28, 2014", 5 pgs.
"U.S. Appl. No. 13/605,672, Preliminary Amendment filed Sep. 13, 2012", 3 pgs.
"U.S. Appl. No. 13/605,672, Response filed Apr. 22, 2014 to Non Final Office Action dated Nov. 29, 2013", 12 pgs.
"U.S. Appl. No. 13/605,672, Response filed Nov. 13, 2014 to Final Office Action dated Aug. 13, 2014", 10 pgs.
"U.S. Appl. No. 14/664,748, Non Final Office Action dated Jul. 8, 2015", 10 pgs.
"U.S. Appl. No. 14/664,748, Notice of Allowance dated Feb. 12, 2016", 5 pgs.

(56) References Cited

OTHER PUBLICATIONS

"U.S. Appl. No. 14/664,748, Preliminary Amendment filed Apr. 30, 2015", 8 pgs.
"U.S. Appl. No. 14/664,748, Response filed Oct. 15, 2015 to Non Final Office Action dated Jul. 8, 2015", 8 pgs.
"European Application Serial No. 11188362.5, Search Report dated Mar. 15, 2012", 6 pgs.
"European Application Serial No. 12829509.4, Office Action dated May 4, 2015".
"European Application Serial No. 12829509.4, Office Action dated Sep. 16, 2015", 12 pgs.
"International Application Serial No. PCT/US2012/054203, International Preliminary Report on Patentability dated Mar. 20, 2014", 7 pgs.
"International Application Serial No. PCT/US2012/054203, International Search Report dated Dec. 6, 2012", 3 pgs.
"International Application Serial No. PCT/US2012/054203, Written Opinion dated Dec. 6, 2012", 6 pgs.
"Chinese Application Serial No. 201280054299.8, Office Action dated Apr. 5, 2016", W/ English Translation, 12 pgs.
"Chinese Application Serial No. 201280054299.8, Office Action dated Dec. 8, 2016", W/ English Translation, 6 pgs.
"Chinese Application Serial No. 201280054299.8, Response filed Aug. 9, 2016 to Office Action dated May 4, 2016", W/ English Translation, 8 pgs.
"Australian Application Serial No. 2012304456, First Examimer Report dated Sep. 15, 2016", 2 pgs.
"Australian Application Serial No. 2012304456, Response filed Mar. 16, 2017 to First Examiner Report dated Sep. 15, 2016", 55 pgs.
"Australian Application Serial No. 2012304456, Notice of Acceptance for Patent Application dated Apr. 3, 2017", 3 pgs.
"Chinese Application Serial No. 201280054299.8, Office Action Response filed Feb. 23, 2017", W/English Claims, 13 pgs.
"Chinese Application Serial No. 201280054299.8, Notice of Decision to Grant dated Mar. 22, 2017", W/ English Translation, 4 pgs.

* cited by examiner

APPARATUS AND METHOD FOR EPG SORTING AND AUTOMATIC REALIGNMENT

RELATED APPLICATION

The present application is a continuation of U.S. application Ser. No. 14/664,748 filed Mar. 20, 2015, which is a continuation of U.S. application Ser. No. 13/605,672 filed Sep. 6, 2012, and issued as U.S. Pat. No. 8,997,151, granted on Mar. 31, 2015, and claims the priority benefit of U.S. Provisional Patent Application No. 61/531,621, filed Sep. 7, 2011 and entitled "Apparatus and Method of EPG Sorting and Automatic Realignment" and to EP Application No. EP11188362, filed Nov. 9, 2011 and entitled "Apparatus and Method for Navigating an Electronic Program Guide." The content of the aforementioned applications are incorporated herein in their entirety by reference.

FIELD

The present disclosure relates generally to electronic program guides (EPG), and in a specific example embodiment, to apparatuses and methods for EPG sorting and automatic realignment.

BACKGROUND

Conventionally, an EPG is an interactive, onscreen display feature which displays information analogous to television listings for channel programming. The EPG is typically arranged in a grid format with time listed on one axis and channels listed on another axis. The EPG provides users with information about each program covered by the EPG, which typically ranges from a current time through the next several days. Information about each program may include a time, duration, synopsis, program title, topic, or theme.

Additionally, conventional interactive EPGs allow users to scroll up, down, left or right on a time and channel basis. When this navigation occurs the entire grid shifts in the corresponding direction because all the channels and times are affected. Furthermore, a user has to scroll all the way back if the user wishes to go back to their original start time. The original start time corresponds to shows that are within a current time frame, and the user cannot view shows which have already aired.

BRIEF DESCRIPTION OF DRAWINGS

Various ones of the appended drawings merely illustrate example embodiments of the present invention and cannot be considered as limiting its scope.

DETAILED DESCRIPTION

Figure 1:
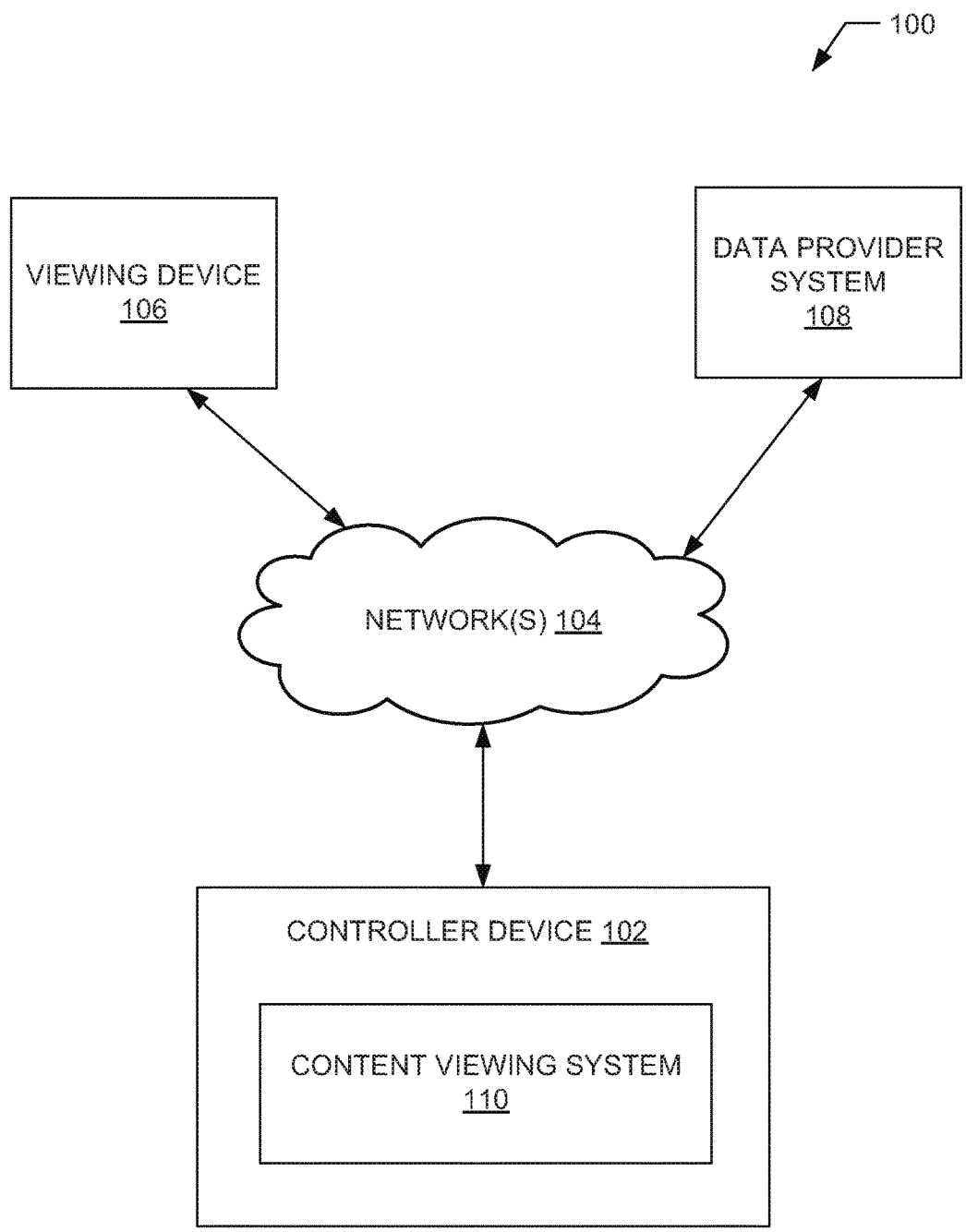
FIG. 1 is a block diagram illustrating an example environment in which example embodiments may be utilized.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for electronic programming guide (EPG) sorting and automatic realignment. In example embodiments, a graphical user interface having an electronic program guide (EPG) including a plurality of rows of thumbnails representing programs is presented on a device of a user. Each row of thumbnails may be navigated independent of other rows. A navigational input is received via a touchscreen of the device. The navigational input indicates an action performed on the graphical user interface that triggers a realignment of programming information presented on the EPG. An updated EPG with the realignment of the programming information indicated by the navigational input is then provided.

The navigational input may comprise a scrolling input and the realigning comprises causing one row of the plurality of rows of thumbnails to shift in time in a direction of the scrolling input. In some embodiments, the scrolling input causes presentation of the updated EPG with the updated thumbnails representing past aired programs. Alternatively, the navigational input may comprise a scrolling input and the realigning comprises causing the plurality of rows of thumbnails to shift in a vertical direction to display further rows of the updated thumbnails. The shift in the vertical direction still maintains each of the rows of thumbnails in a locked position based on a previous navigational input. Further still, the realigning may comprise visually scrolling each visible row of the EPG to their realigned position on the updated EPG at a speed that results in all visible rows reaching their realigned position at a same time. In example embodiments, the speed of realignment depends on how far away a current information set is from a final realigned position. This speed may be automatically calculated.

In example embodiments, a selection input may trigger the realignment. For example, a time selection input may result in presenting updated thumbnails that are based on a user-selected time. The user-selected time may correspond to programs now playing or programs in primetime. Alternatively, a favorites selection input may be received which causes presentation of the updated thumbnails representing programs marked as favorite by the user. In example embodiments, a program may be marked as a favorite by receiving an indication to mark the program as a favorite and providing an overlay image over a thumbnail of the program marked as favorite. A tag selection input may cause presentation of the updated thumbnails organized based on meta-tag information, wherein each row of the updated EPG is associated with a different meta-tag. Further still, the input may be a social selection input that causes presentation of the updated thumbnails organized based on programs viewed by social connections of the user, wherein each row of the updated EPG is associated with a different social connection of the user.

By using embodiments of the present invention, a user can easily and more quickly navigate to desired programming information on the EPG. Accordingly, one or more of the methodologies discussed herein may obviate a need for extended search and navigation of the EPG, which may have the technical effect of reducing computing resources used by one or more devices within the system. Examples of such computing resources include, without limitation, processor cycles, network traffic, memory usage, storage space, and power consumption.

With reference to FIG. 1, an embodiment of an example environment 100 that enables the use of a system for EPG sorting and automatic realignment is shown. A controller device 102 is coupled via one or more communication networks 104 (e.g., the Internet, wireless network, cellular network, Bluetooth, Local Area Network (LAN), or a Wide Area Network (WAN)) to a viewing device 106 and a data provider system 108.

The controller device 102 is a device that allows the user to navigate the EPG. In example embodiments, the controller device 102 is a touch tablet device, such as a tablet computing device, mobile device, or portable media player device. Further still, the controller, device may be a mobile phone, desktop computer, laptop, or any other communication device that is capable of communicating via the communication networks 104. In example embodiments, the controller device 102 comprises a display to present information included in the EPG. The controller device 102 may further comprise a touch screen or other input mechanism for receiving inputs from the user for navigating the EPG.

In an example embodiment, the controller device 102 comprises a content viewing system 110 that provides a user-friendly, navigable user interface for presenting the EPG on the controller device 102. In one instance, the content viewing system 110 comprises content browsing and viewing modules that provide various graphical user interface elements. For example, the EPG may generally include rows of uniform sized thumbnails each representing programming (e.g., a program), which the user may navigate by scrolling with his finger. Each row may represent a channel of a different broadcast network. In addition, the user interface may include icons that trigger realignment based on time, favorites/preferences, content recommendations, and social connections. The content viewing system 110 will be discussed in more detail in connection with FIG. 2.

The viewing device 106 is a device for viewing the programming. For example, the viewing device 106 may be a television (e.g., a smart television or Internet television) or a computer. While the viewing device 106 is shown to be separate from the controller device 102, example embodiments may combine the controller device 102 and the viewing device 106 into a single device.

The data provider system 108 provides information to enable the navigation and display of the EPG on the controller device 102. The data provider system 108 may be associated with a local broadcaster, cable provider, satellite television provider, or any other entity that provides information or access to programming information. Accordingly, the data provider system 108 may push, or the controller device 102 may pull, various programming information from a data store of the data provider system 108. The controller device 102 may also locally store retrieved programming information.

The environment 100 of FIG. 1 is merely an example. A skilled artisan will recognize that the present disclosure is not limited to such an architecture or environment 100. For example, it will be appreciated that in alternative embodiments any number of controller devices 102, viewing devices 106, and data provider systems 108 may be present in the environment 100.

Figure 2:
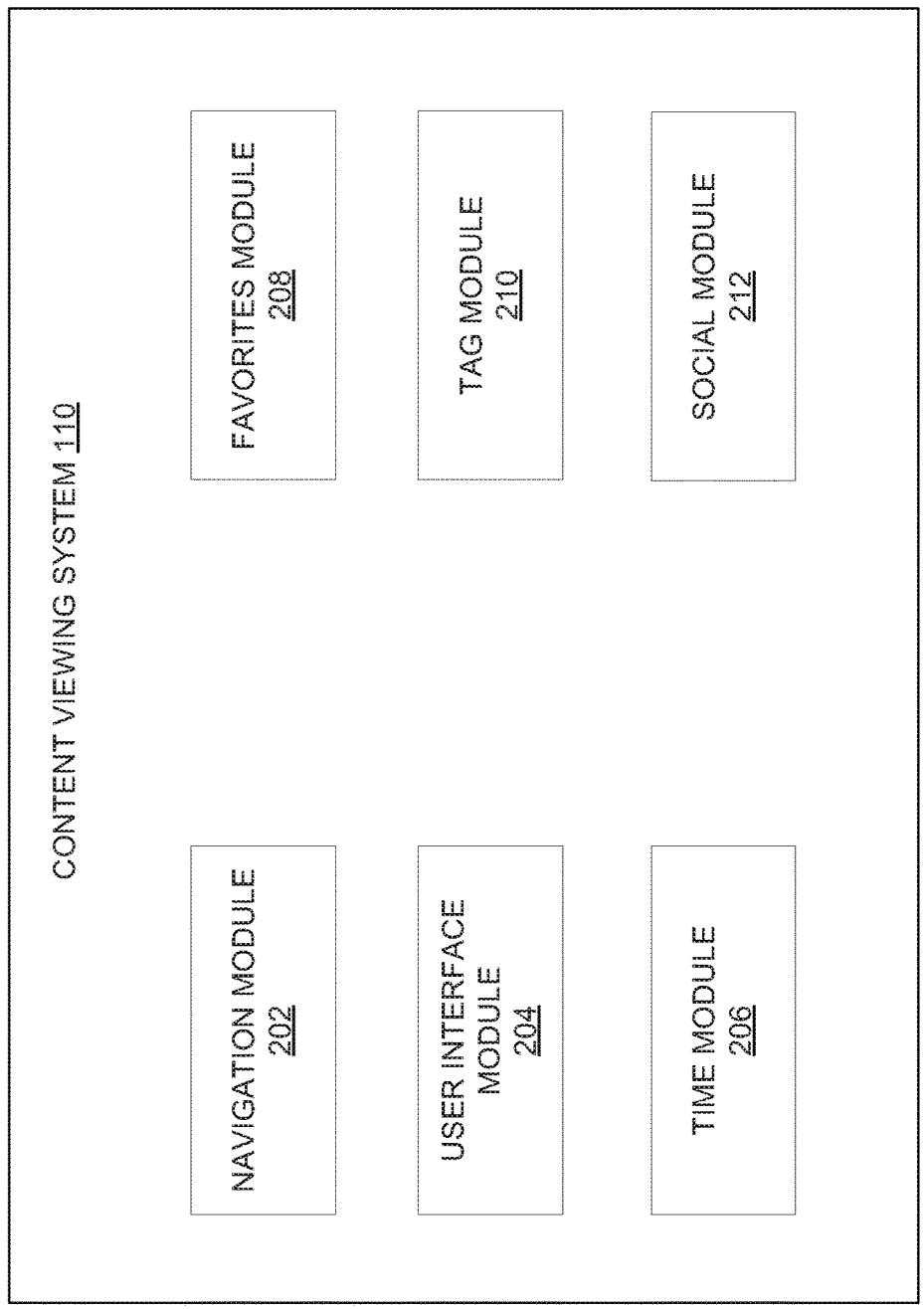
FIG. 2 is a block diagram illustrating an example embodiment of a content viewing system.

Referring now to FIG. 2, an example block diagram is shown illustrating multiple components that, in one embodiment, are provided within the content viewing system 110. In example embodiments, the content viewing system 110 provides graphical user interfaces of EPGs that illustrate rows of thumbnails that each represents a program, whereby each row may represent a channel or network. The user may individually navigate the rows by scrolling or swiping, for example, by using their finger. Additionally, the content viewing system 110 may also provide icons on the user interface that are associated with time, favorites, tagged metadata, and social connections, which allow the user to quickly access associated programming information. To enable these operations, the content viewing system 110 comprises a navigation module 202, a user interface module 204, a time module 206, a favorites module 208, a tag module 210, and a social module 212. It is noted that not all modules of the content viewing system 110 may be used in various example embodiments and that functions of some modules may be combined, divided into a plurality of modules, or be made optional.

The navigation module 202 receives user inputs and accesses the appropriate information to enable a proper set of programming information to be returned to the user. The information may be accessed from the data provider system 108 or from a local data store coupled to or embodied within the controller device 102. Accordingly, the navigation module 202 may receive a scrolling input that indicates a direction (e.g., left, right, up, down) to move the programming information that is displayed in the EGP. For instance, a scroll to the left may move a row of programming information for a particular channel associated with the row to the left, which enables presentation of programming information that is further in time in the future. Furthermore, the navigation module 202 may receive a selection of an icon or button that indicates a particular set of programming information that the user desires to view. The icons may be associated with time, favorites, metadata tags, and social connections. Operations associated with each of these icon selections will be discussed in further detail below.

Based on the appropriate information obtained by the navigation module 202, the user interface module 204 uses the information to generate a graphical user interface to display updated thumbnails and programming information. In some embodiments, the obtained information may be further processed by other modules of the content viewing system 110 prior to the generation of the graphical user interface. Various sample user interfaces that are generated by the user interface module 204 are shown in FIG. 3 to FIG. 7.

The time module 206 manages programming information based on time. In example embodiments, the time module 206 is triggered by a selection of a time icon on the user interface. Once triggered, the time module 206 may realign channels of the EPG to a particular time. In some embodiments, the time module 206 processes retrieved information obtained by the navigation module 202 to provide the realigned programming information. For example, a user may press and hold his finger on a time icon, while dragging, or otherwise moving his finger to "pull" the time icon and "drop" the time icon on top of a thumbnail of a program (e.g., perform a "drag-and-drop" operation of a time icon). By dragging and dropping the time icon over the top of the thumbnail of the program, an automatic operation to realign all rows of channels may be performed by the time module 206 such that the start time across all channels on the EPG corresponds to a time frame of the thumbnail of the program on which the time icon was dropped. More precisely, the time icon allows the user to automatically find all programming being aired across all channels during a user selected time frame that is associated with the thumbnail that was selected. All the rows of channels may automatically realign such that the start time on all rows of the EPG corresponds to the user's selected time.

In another embodiment, the user may select the time icon, and a drop down menu is provided (e.g., by the time module 206) that lists options for selecting programs. The options may comprise "now playing," "primetime," or a user selected time frame. The user may then select one of the options and the time module 206 processes the programming information to provide the selected programming information.

The favorites module 208 manages programming information based on favorite or preference information associated with the user. User preference information may be stored locally at the content viewing system 110 or remotely at an external system such as the data provider system 108. In some embodiments, dragging and dropping of a favorites icon onto a thumbnail of a program may automatically tag, by the favorites module 208, the thumbnail program as a favorite program of the user. Additionally, an overlay of a heart symbol (or other symbol to indicate a favorite) is placed on the thumbnail image so that the user may recognize the program as being tagged under his favorites. The user can also unselect a favorite program by clicking the heart symbol or by going to a media card for that thumbnail program and selecting a "remove favorite" button (or a similar functioning button). More precisely, dragging and dropping the heart icon onto a thumbnail of a program allows the user to mark that program as a part of his list of favorite programs that is stored by the favorites module 208.

In some embodiments, the user may click on or select the favorites icon which triggers the favorites module 208 to show programs tagged by the user as his favorite. In some embodiments, the favorites module 208 processes retrieved information obtained by the navigation module 202 to provide the realigned programming information. In one embodiment, the favorites module 208 may automatically align the favorite programs on the EPG grid irrespective of their row of channel association. For example, the updated thumbnails of the favorite programs may be ordered based on time (e.g., those programs which are currently airing to those which are airing at a time furthest from the user's current time) regardless of the broadcast channel. More precisely, the favorites icon allows the user to automatically find all programming being aired (or that will be aired) across all channels that the user has marked as a favorite.

The tag module 210 manages programming information based on meta-tags or metadata associated with the programs. In some embodiments, dragging and dropping a tag icon over a thumbnail of a program causes the tag module 210 to determine programs that have matching meta-tags as that of the program on which the tag icon was dropped. The meta-tags may comprise information about the specific program on which the tag icon was dropped, such as names of actors, type of genre, or theme type. Meta-tags may be associated with any descriptors that are available for programs. Accordingly, each meta-tag associated with the thumbnail on which the tag icon is dropped may be displayed as its own channel in the row of channels. Media content with similar meta-tags may be provided within the respective meta-tag channel. The updated thumbnails of programs are ordered based on those thumbnails of programs which are currently airing to those which are airing at a time furthest from the user's current time. More precisely, the tag icon allows users to search and navigate what other content-related programming is airing based on the meta-tags of a selected program where each meta-tag is used as a channel marker.

In some embodiments, the user may click or select the tag icon which causes a dropdown menu to be provided with various methods for sorting the content of the EPG. The tag module 210 may allow the user to sort, for example, by genre, popularity, or relevance. Other sort categories may also be used. Based on the user selection, the tag module 210 determines the matching programs e.g., using retrieved information obtained by the navigation module 202) and updated thumbnails of the programs will align accordingly.

The social module 212 manages programming information based on social connections of the user. By clicking or selecting a social icon, the row of channels are organized based on the user's social connections, such that each row of the EPG provides updated thumbnails of programs that a particular friend is viewing or has viewed. Accordingly, the social module 212 may access or upload social connection information from social networks (e.g., Facebook®, Myspace™, Twitter™, or other user selected social networks). Thus, the selection of the social icon triggers the social module 212 to determine what friends of the user are viewing or have viewed. The updated thumbnails of the programs may be ordered based on their air time with currently playing programs appearing first.

It is noted that while example icons representing particular tools for realignment are provided (e.g., favorites, tags, social), the present embodiment is not limited to these tools. Alternative embodiments may contemplate other tools for sorting content and realigning the EPG.

Figure 3A:
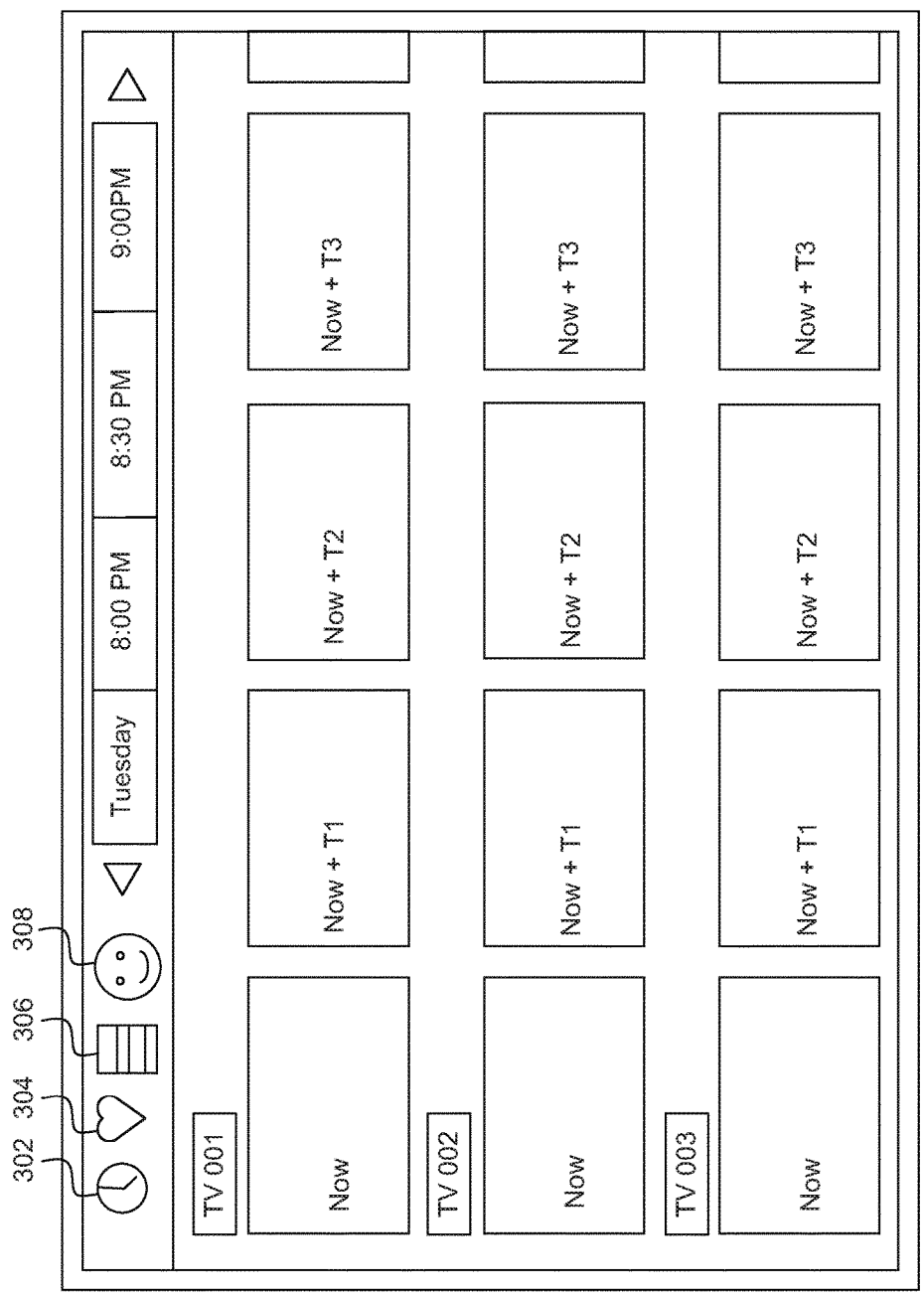
FIG. 3a-3d are sample user interfaces illustrating various navigations on an EPG.

FIGS. 3a-3d are sample user interfaces illustrating various results based on navigations performed on an example EPG user interface. Referring to FIG. 3a, an EPG user interface 300 is shown prior to any user navigations. Thus, the user interface module 204 may provide an EPG having thumbnails of uniform size horizontally lined up in rows according to their corresponding channel or broadcast network. For example, the first row is channel "TV 001" while the second row is channel "TV 002." Each thumbnail may comprise an image or moving video display of a program as provided by a broadcast network. The thumbnail may also provide a designated start time of the program. The start time does not necessarily have to be in half-hour blocks as some programs may start before or after the half-hour block. Programs that are currently playing may have an overlay image of "Now" in place of the designated start time.

A top of the EPG user interface 300 (above the EPG) comprises a menu including selectable icons from which the user may indicate a manner in which to view the programming. For example, a time icon 302 allows the user to align programming based on time, a favorites icon 304 (e.g., a heart) allows the user to align programming based on favorite programs, a tag icon 306 allows the user to align programming based on certain meta-tags of programs; and a social icon 308 (e.g., a face) allows the user to align programming based on viewing behavior of social connections.

Figure 3B:
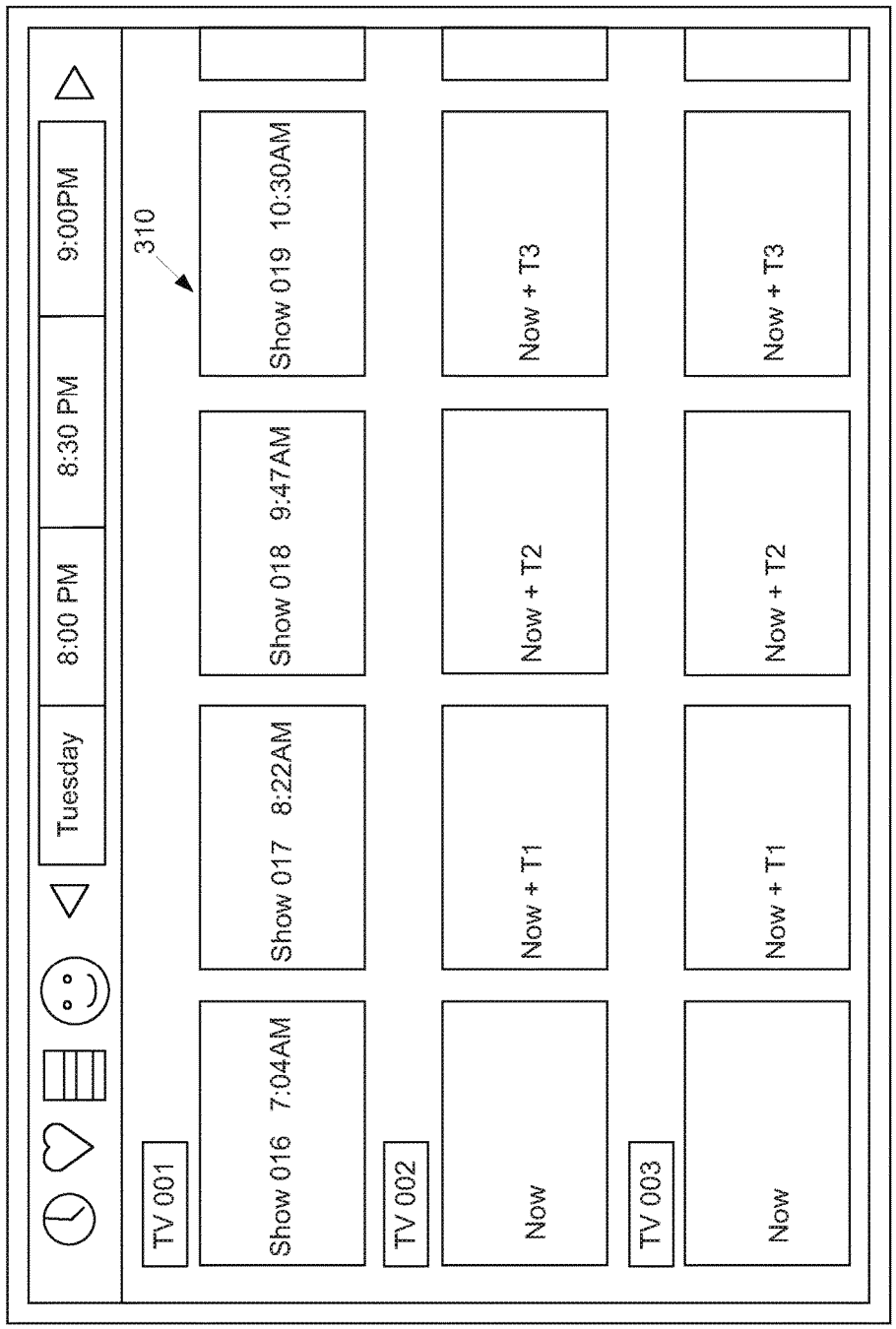

In example embodiments; the user may navigate an individual channel of programming independent of other channels of programming. The navigation may be performed by the user sliding or swiping his finger right or left (e.g., a scrolling input) over a row representing the channel and the thumbnails will shift accordingly. Referring now to FIG. 3b, a user has scrolled several days ahead on a first displayed row of channels 310 (e.g., channel TV 001) while the other displayed rows of programs remain at a current time position (as evidenced by the "Now" image on a first thumbnail in the row).

Figure 3C:
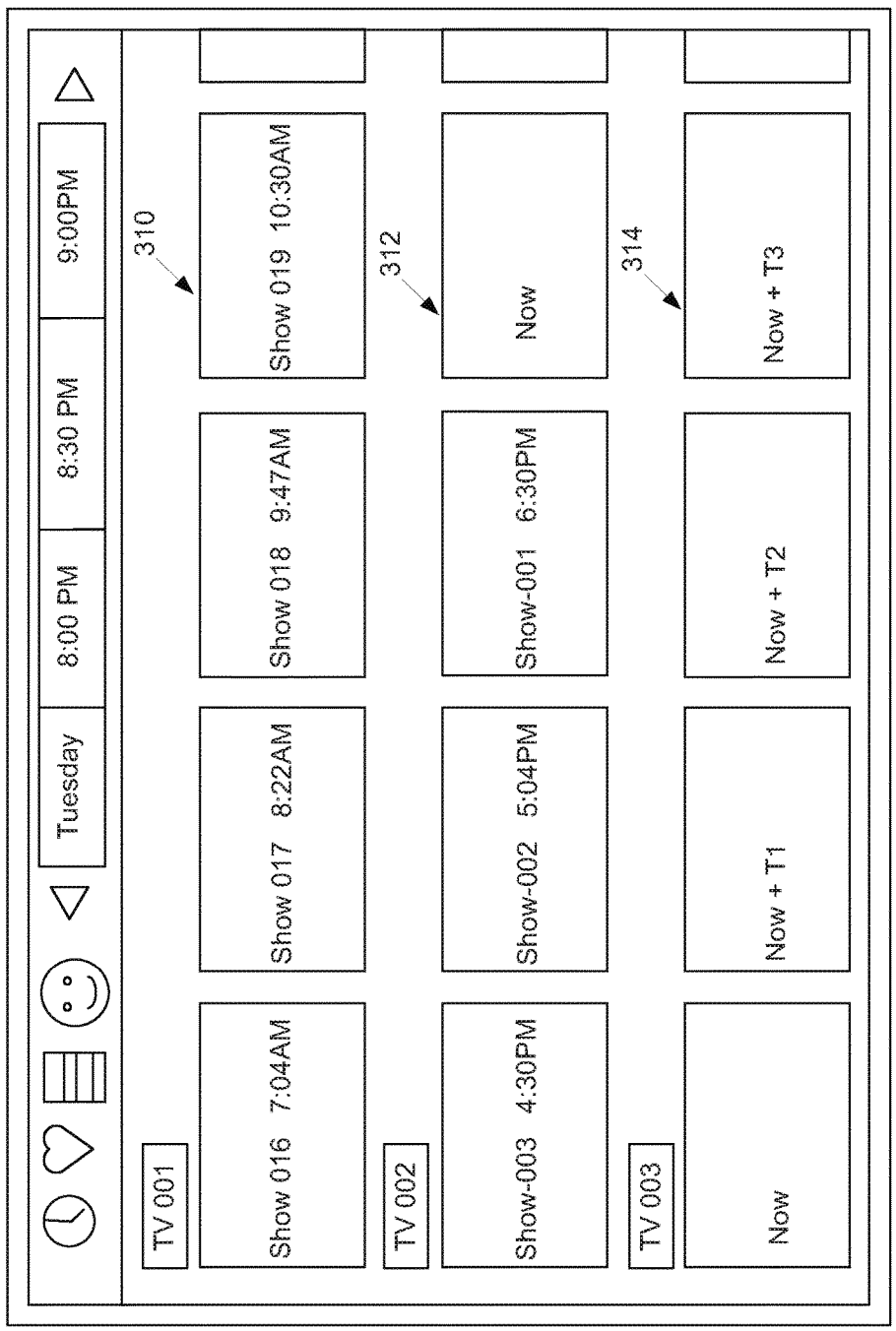

Additionally as shown in FIG. 3c, the user scrolls back in time on a second displayed row of channels 312 (e.g., channel TV 002) in addition to the scroll forward on the first displayed row of channels 310. More precisely, the user may scroll the first row of channels 310 to the left to go forward in time and scroll the second row of channels 312 to the right to go backward in time. By navigating back in time, the user is presented with updated thumbnails of programs that have already aired. In some embodiments, only thumbnails for programs which have been recorded by the broadcast network or directly by the user are shown. This enables the user to select a previously aired program for later viewing. In these embodiments, a program that is not recorded may display a blank thumbnail with an overlay image indicating that the program is not available. A third row of channels 314 remains unchanged, showing thumbnails of programs starting from a current time.

Figure 3D:
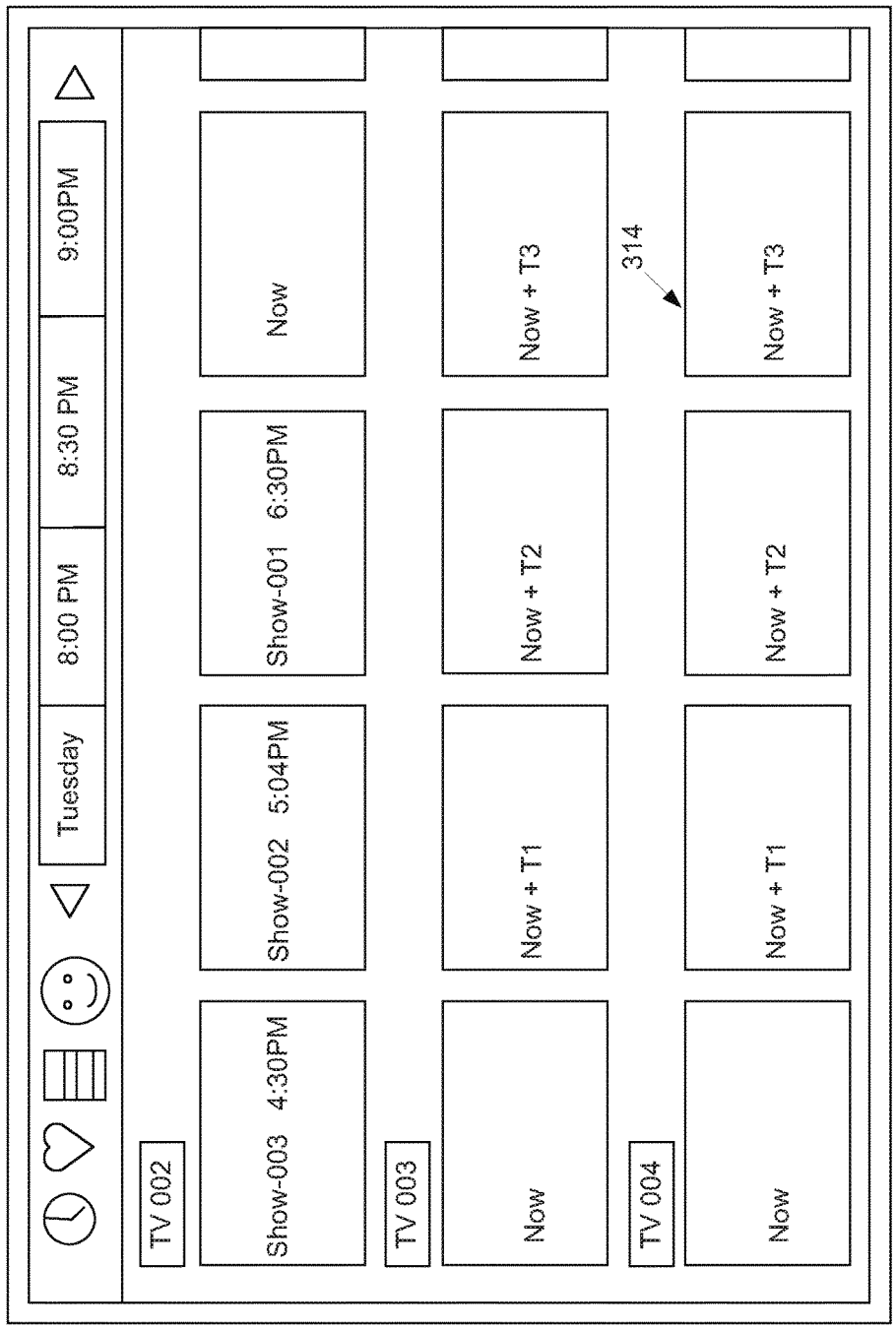

The navigation module 202 also allows scrolling up and down that causes the rows of channels to shift in a vertical direction to show further rows of channels and their associated thumbnails. For example, FIG. 3d shows a scroll up navigation (e.g., scrolling input) whereby channel "TV 001" has navigated off the EPG and channel "TV 004" now appears at a bottom of the EPG. During the up and down scrolling, the rows of channels may not realign unless designated by the user. More precisely, each of the rows of channels is locked to where the user designated and remains in that location while the user scrolls up or down through the rows of channels. Thus, channel "TV 002" continues showing the past aired thumbnails of programming that was arrived at in FIG. 3c by a right direction scroll by the user.

In one embodiment, when the user chooses to realign the thumbnails, the speed at which the thumbnail programs will readjust depends on how far forward or back the user has navigated each individual row of channels. For instance, if a user has navigated only a few shows back on one row of channels and a couple days forward on a second row of channels, then the rows of channels may scroll back at different speeds such that all the rows of channels stop the realignment process simultaneously (e.g., the first row will scroll back at a slower rate than the second row). Thus, the speed of realignment depends on how far away a current information set is from a final realigned position. This speed may be automatically calculated.

Figure 4:
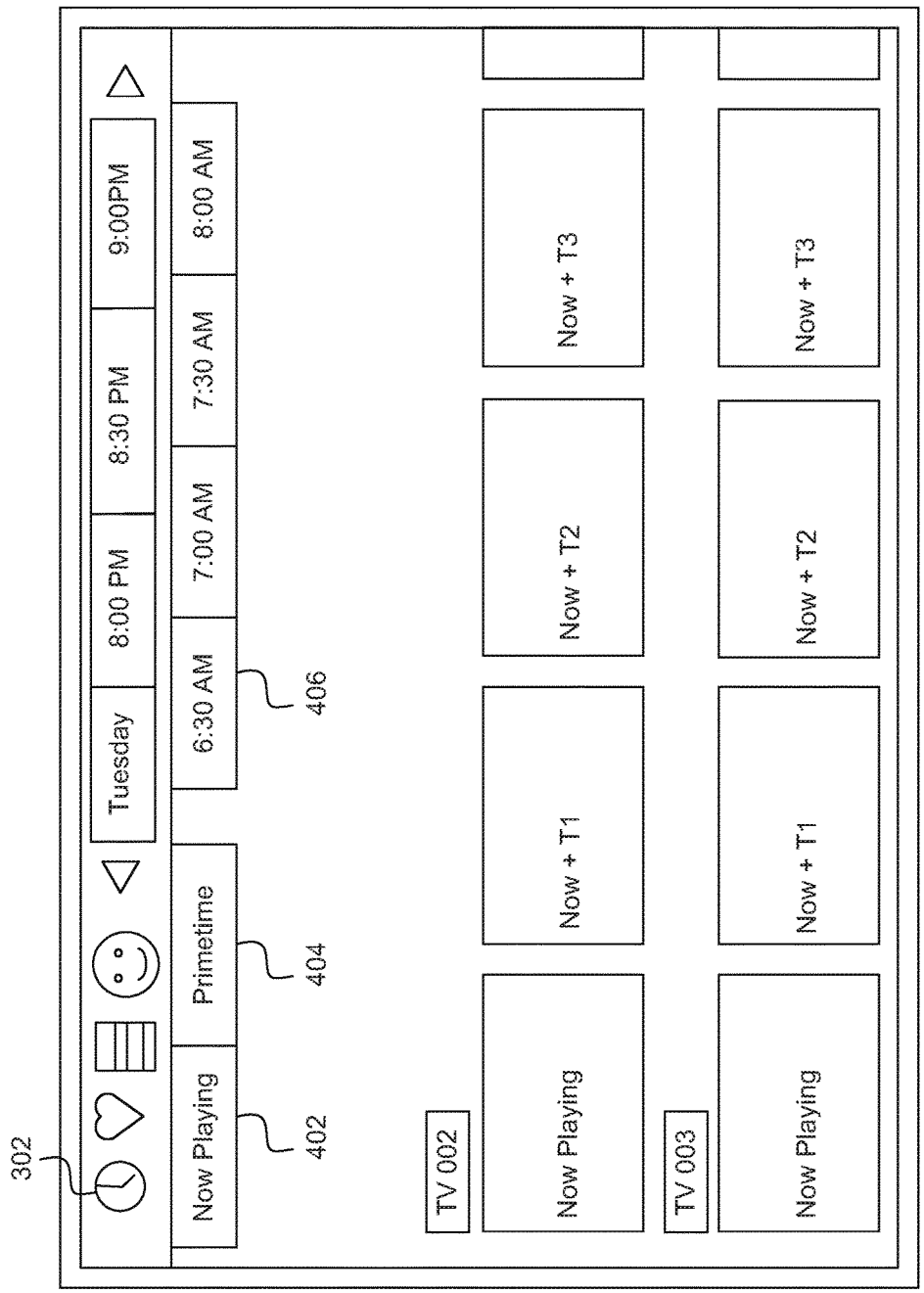
FIG. 4 is a sample user interface illustrating a time selection input.

FIG. 4 is a sample user interface illustrating a time selection input. As previously discussed, the user may select the time icon 302, in one embodiment, which triggers display of a drop down menu listing options for selecting programs. As shown, the options may include a "Now Playing" option 402, a "Primetime" option 404, and a timeframe 406. The timeframe 406 may be a user-selected timeframe. In the example, the timeframe 406 starts as 6:30 AM. The user may use his finger to scroll left or right on the timeframe 406 and select a time in order to view updated thumbnails of programs scheduled during the selected time (or corresponding timeframe). When the user scrolls the timeframe 406, the "Now Playing" option 402 and "Primetime" option 404 remain constant such that the user may select those options at any time despite the location of the timeframe scrolling. More precisely, the user can scroll and click on any time on the timeframe 406 or the "Now Playing" or "Primetime" options 402 and 404 to automatically align to the selected time or option. In one embodiment, the "Now Playing" option 402 realigns the thumbnails of programs back to a current time for all the channels. (e.g., such as that shown in FIG. 3a.) In contrast, the "Primetime" option 404 may realign the channels of thumbnails to show a primetime lineup (e.g., from 8:00 PM to 11:00 PM).

Figure 5:
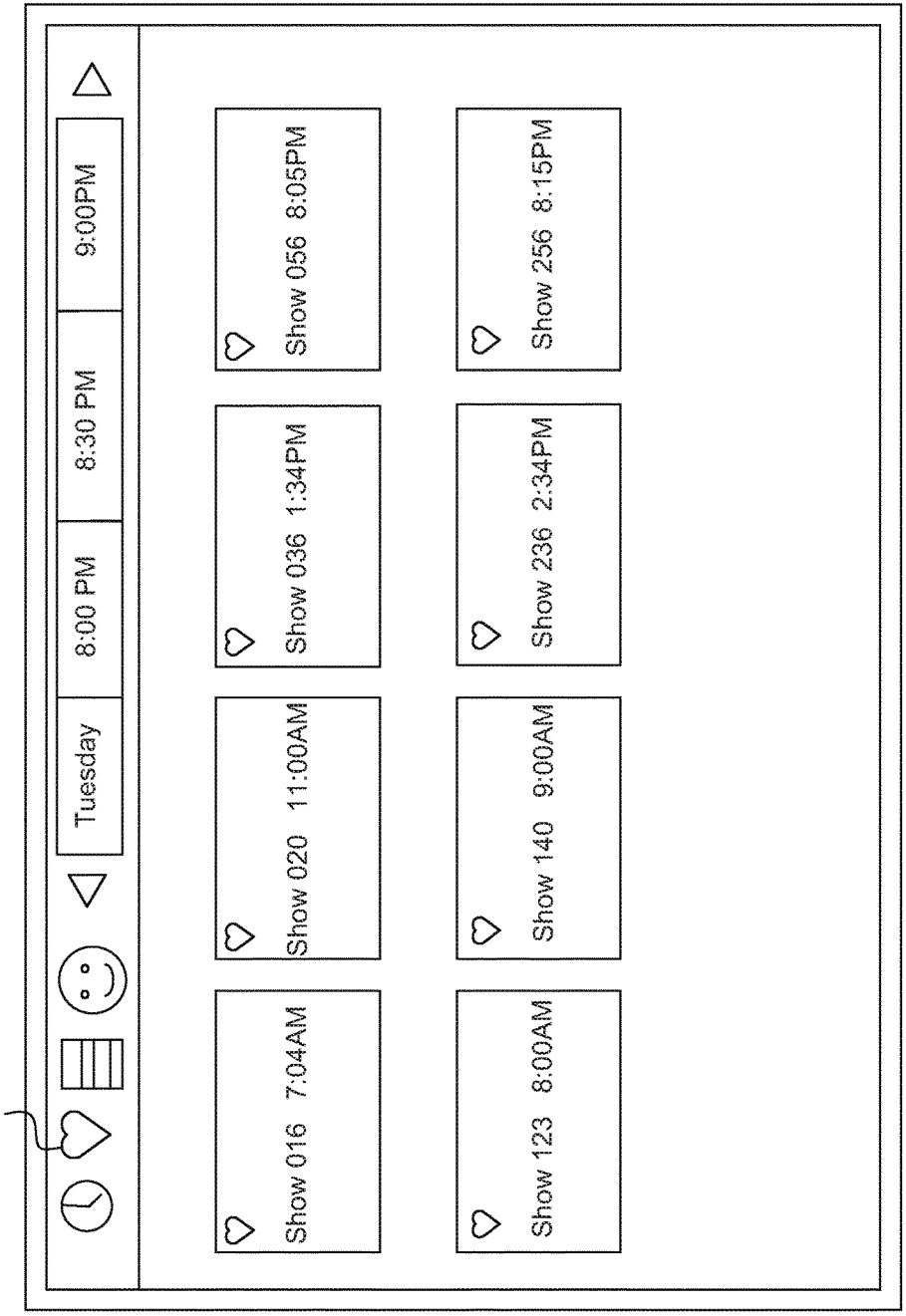
FIG. 5 is a sample user interface illustrating a favorites selection input.

FIG. 5 is a sample user interface illustrating a favorites selection input. When a user tags a program as a favorite, a favorites image (e.g., a heart) is overlaid over the thumbnail of the program. Furthermore, the user may select the favorites icon 304 which triggers the favorites module 208 to show updated thumbnails of programs tagged by the user as his favorite. In one embodiment, the favorites module 208 automatically aligns the favorite programs on the EPG irrespective of their row of channel association. As shown, the updated thumbnails of the programs may be ordered based on time (e.g., those programs which are currently airing to those which are airing at a time furthest from the user's current time). Thus, the favorites icon 304 allows the user to automatically find all programming being aired (or that will be aired) across all channels that the user has marked as a favorite.

Figure 6A:
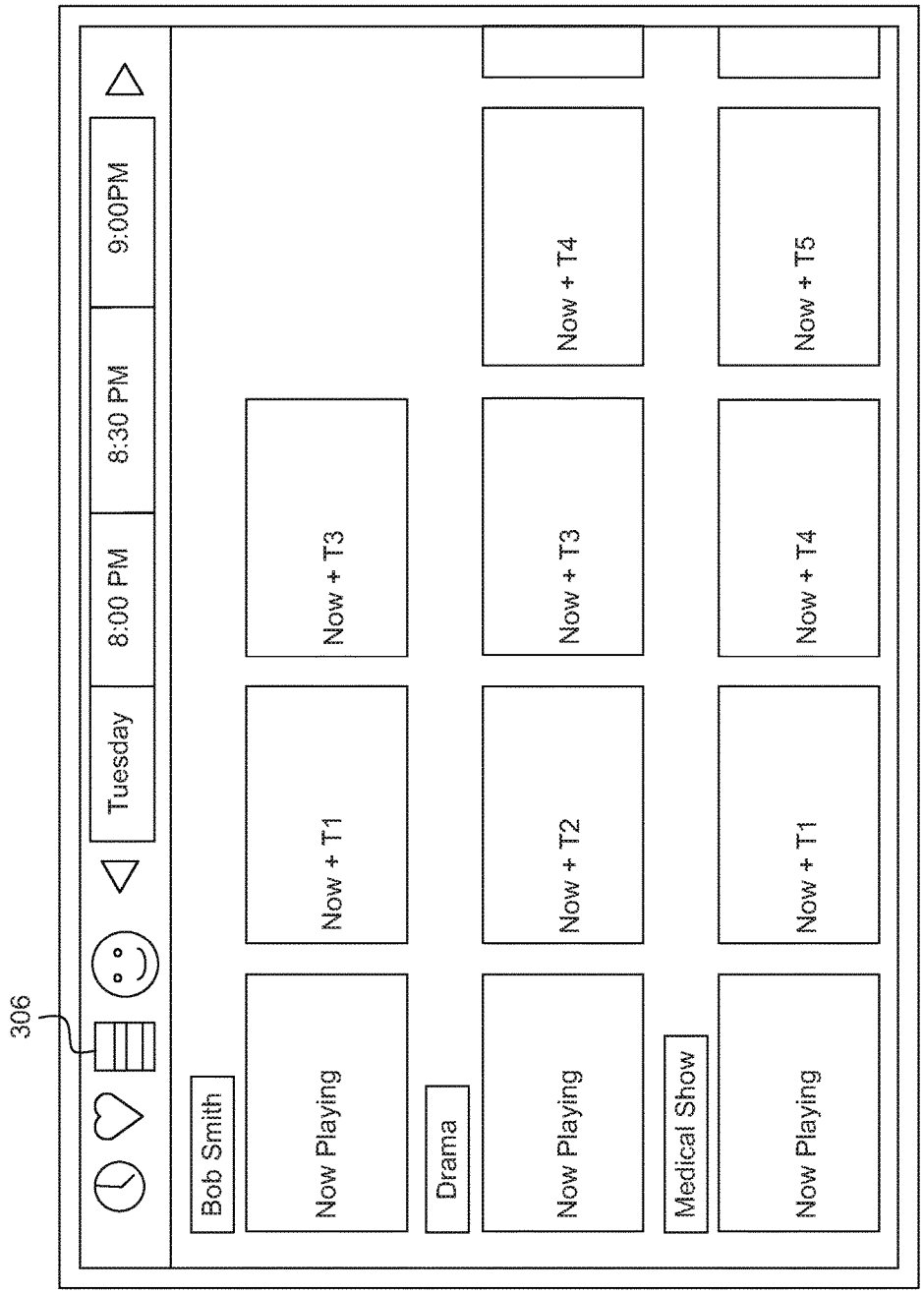
FIG. 6a-6b are sample user interfaces illustrating a tag selection input.
Figure 6B:
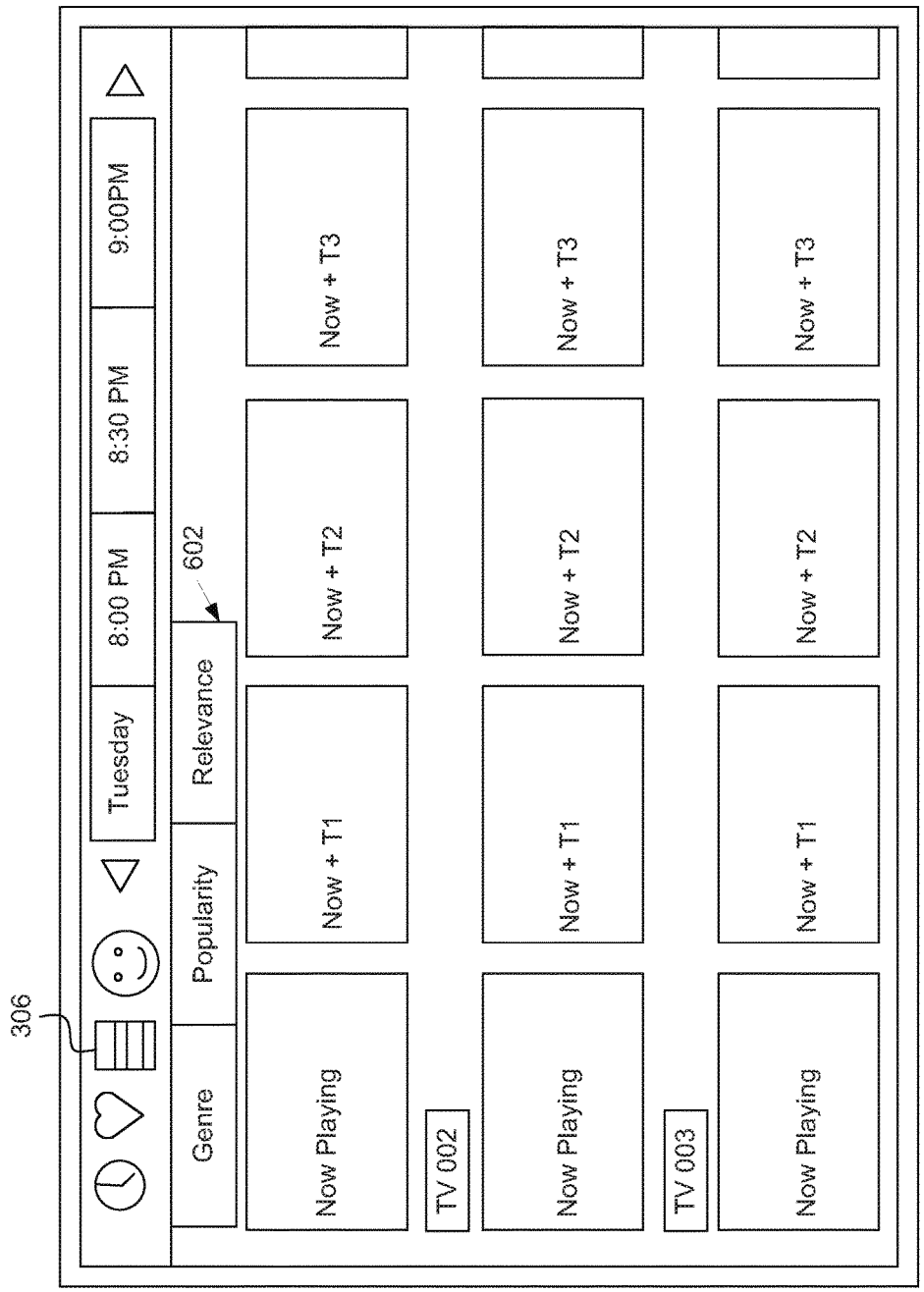

FIGS. 6a-6b are sample user interfaces based on a tag selection input. As previously discussed, dragging and dropping of a tag icon 306 onto a particular thumbnail of a program may cause each meta-tag associated with the thumbnail on which the tag icon 306 is dropped to be displayed as its own channel or row. As shown in the EPG user interface 300 of FIG. 6a, a first row is now associated with an actor named "Bob Smith" and shows updated thumbnails of programs that include a meta-tag for Bob Smith. Since only two programs have a meta-tag for Bob Smith, only two updated thumbnails are provided in the first row. A second row is associated with a genre "Drama" and shows updated thumbnails of programs that are tagged as dramas. Similarly, a third channel is associated with a theme type of "Medical Show" and shows updated thumbnails of programs that are tagged as a medical show.

FIG. 6b illustrates the EPG user interface 300 based on a selection of the tag icon 306 causing a dropdown menu 602 to be displayed on the EPG user interface 300. The dropdown menu 602, in the present example, allows the user to sort by genre, popularity, and relevance. Other sort categories may also be used.

In example embodiments, when the user selects a genre option of the dropdown menu 602, the rows of channels are organized based on genre. In on embodiment, the tag module 210 may analyze retrieved programming information for genre types and organizes the updated thumbnails accordingly. That is, each row may present a different genre, irrespective of broadcast network, such that a user can scroll through the shows in any given genre. The updated thumbnails of the programs are ordered based on their airing time with currently playing programs appearing first within each genre row. As a result, instead of navigating by channel, the user navigates by genre type.

Alternatively, when the user selects a popularity option of the dropdown menu 602, the thumbnails of the programs align to display programs that have been most recorded, most watched, most shared, or most commented. Other popularity categories may also be used. In one embodiment, the tag module 210 may analyze retrieved programming information for popularity and organize updated thumbnails accordingly. These updated thumbnails of the programs may be ordered based on their airing time with currently playing programs appearing first. As such, instead of navigating by channels, the user navigates by the popularity of the updated thumbnails of the programs.

In another example, the user may select a relevance option of the dropdown menu 602. In response, the tag module 210 will provide the programming information aligned with the updated thumbnails of the programs in a recommended order based on the user's behavior and preferences. Accordingly, the tag module 210 may access preference information for the user and use algorithms to determine user behavior and provide recommendations. The user's preferences may include past viewing history, age, gender, and other characteristics. As a result, the user may navigate through the updated thumbnails of the programs which are specially chosen for the user based on the user's viewing behavior and preferences.

Figure 7:
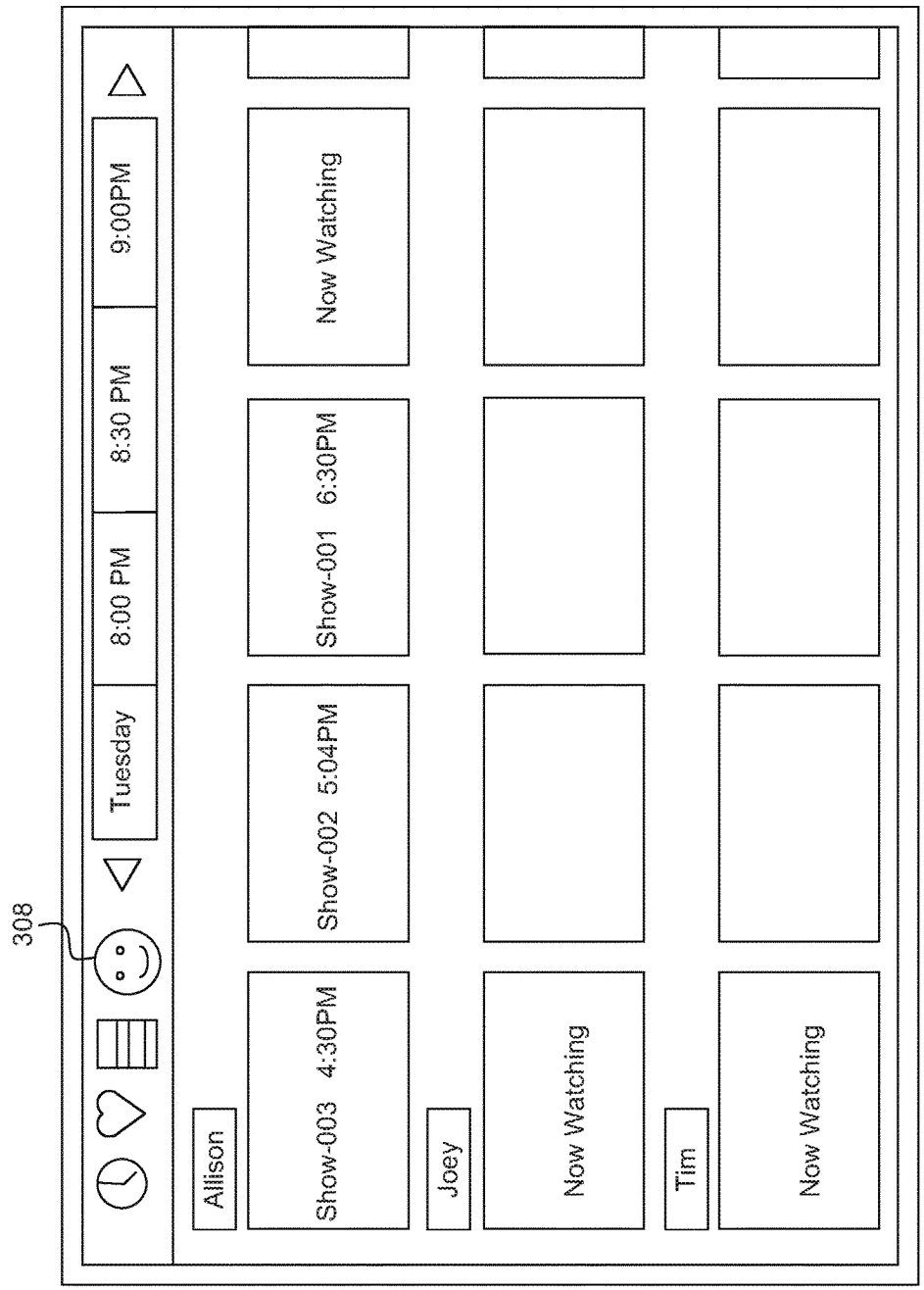
FIG. 7 is a sample user interface illustrating a social selection input.

FIG. 7 is a sample user interface illustrating a social selection input. When the user selects the social icon 308, each row of channels is organized based on the user's social connections, such that each channel or row of the EPG provides updated thumbnails of programs that a particular friend is viewing or has viewed. For example, the first row of channels presents programs that Allison is watching and has watched in the past e.g., based on a scroll right input), while the second row presents what Joey is currently watching. The user may scroll on the row to view what Joey has viewed in the past as well. In some embodiments, a profile image of each friend may be provided in combination with the name on the row or channels. If more social connections are available, further rows or channels may be included and the user may scroll up and down in order to vertically shift the rows and view these further rows or channels.

Accordingly, the social module 212 may access or upload social connection information from social networks (e.g., Facebook©, Myspace©, Twitter©, or other user selected social networks). Thus, the selection of the social icon 308 triggers the social module 212 to determine what friends of the user are viewing or have viewed. The thumbnails of the programs may be ordered based on their airing time with currently playing programs appearing first. Thus, the user is not restricted to navigating based on designated broadcast networks but can navigate through customized viewing preferences of the user's own social connections.

Figure 8:
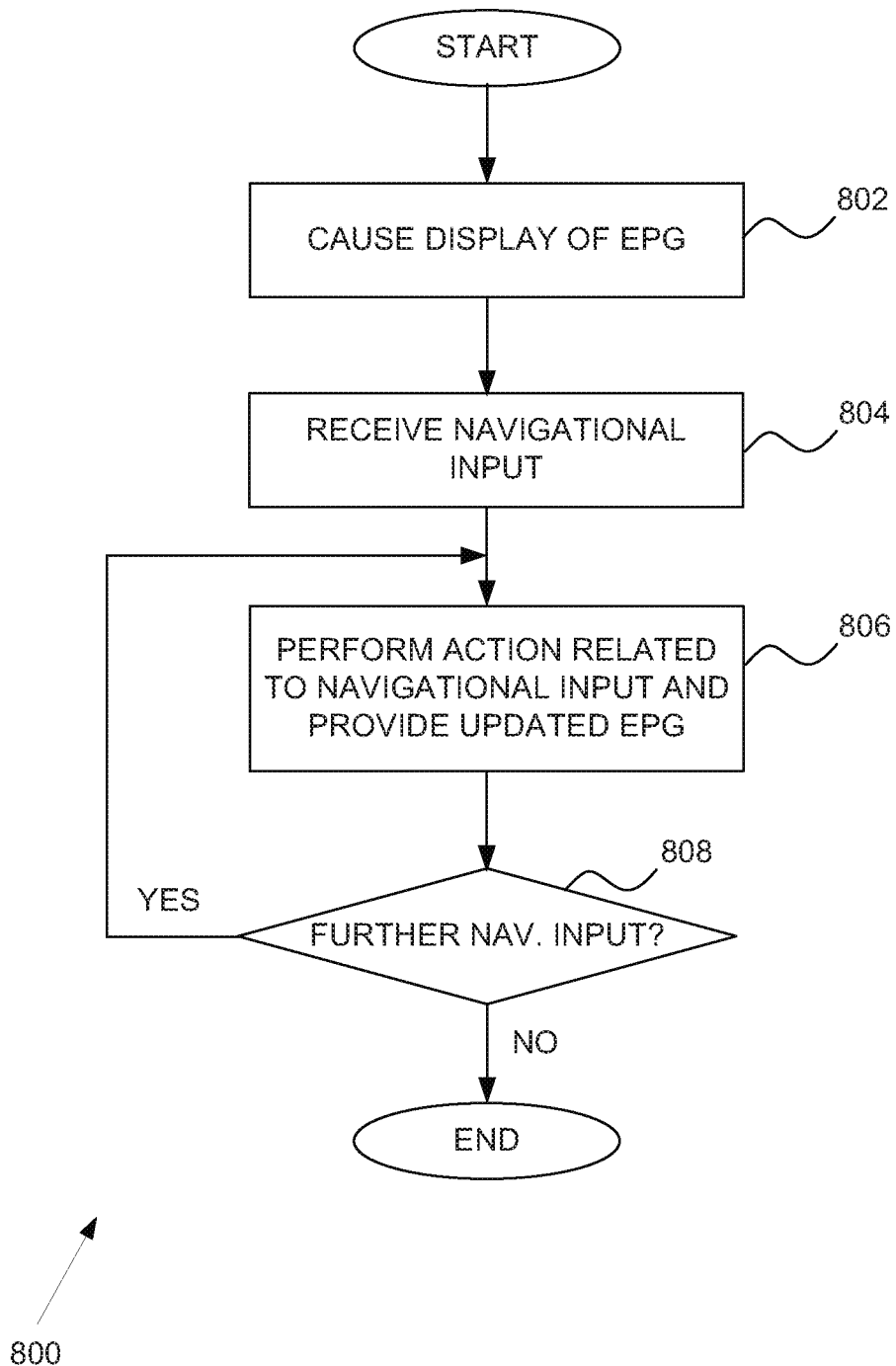
FIG. 8 is a flow diagram of an example high-level method for navigating an EPG.

FIG. 8 is a flow diagram of an example high-level method 800 for navigating an EPG user interface. The method 800 may be performed by various components of the content viewing system 110. In operation 802, an initial or start EPG user interface is displayed to the user. For example, the user interface module 204 may receive a request for display of the EPG user interface and present the EPG user interface 300 shown in FIG. 3a.

In operation 804, a navigational input is received by the navigation module 202. In response, the navigation module 202 accesses the appropriate information to enable a proper set of programming information to be returned to the user. The information may be accessed from the data provider system 108 or from a local data store coupled to or embodied within the controller device 102. For example, the navigation module 202 may receive a scrolling input that indicates a direction (e.g., left, right, up, down) to move the programming content that is displayed on the EPG or a selection of an icon or button that indicates a particular set of programming information that the user desires to view.

An action related to the navigational input is performed in operation 806. For example, if the navigational input is a scroll operation to the left or right, then the EPG is presented with the row of channels selected for the scroll operation providing updated thumbnails of programs updated to a new timeframe. In another example, if the navigational input is a selection of a selectable icon (e.g., time icon 302, favorites icon 304, tag icon 306, or social icon 308), a corresponding module realigns the EPG in response to the selection as discussed above.

In operation 808, a determination is made as to whether a further navigational input is received. If a further navigational input is received, then the method 800 returns to operation 806, otherwise the method 800 ends.

Figure 9:
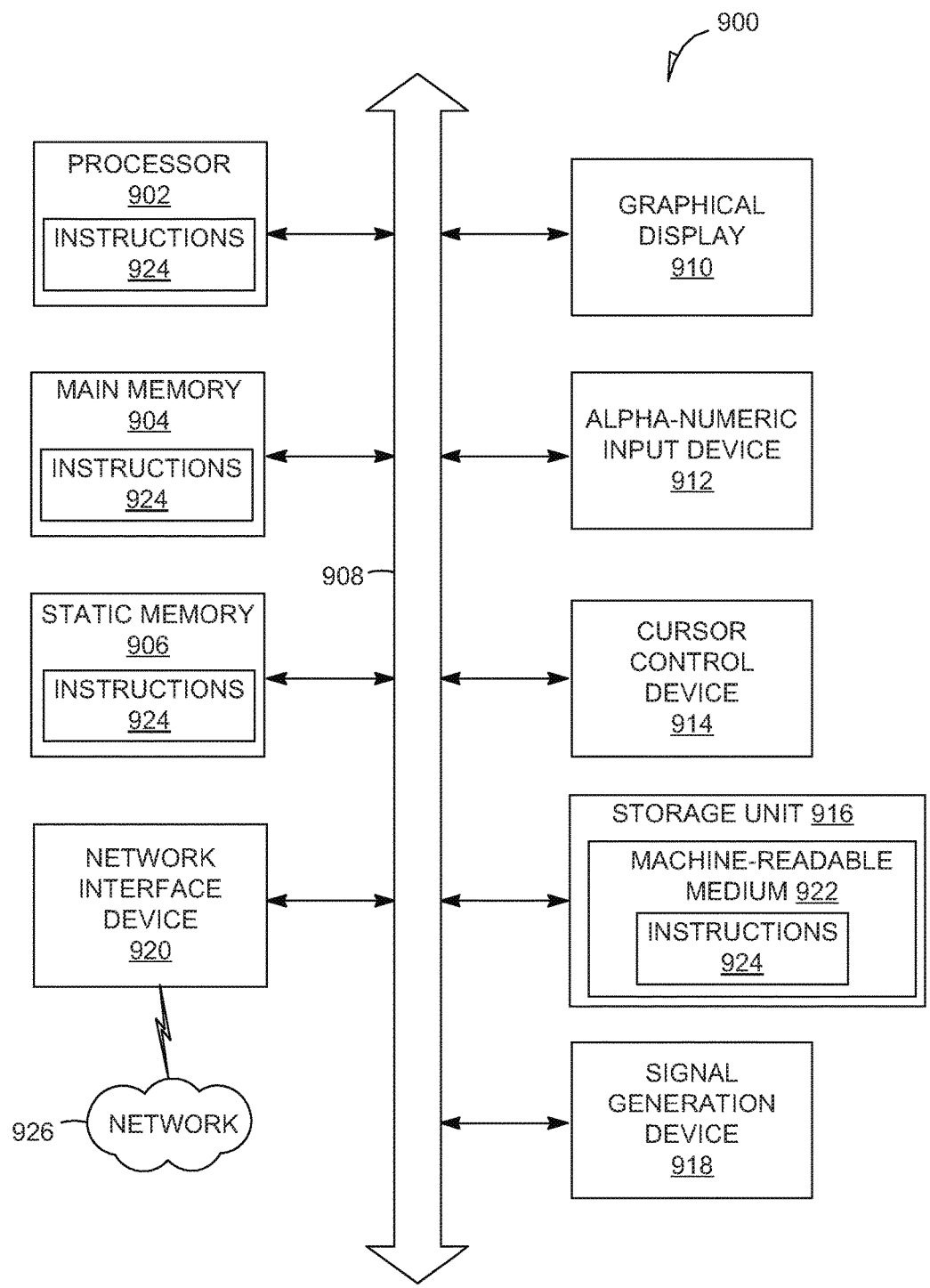
FIG. 9 is a simplified block diagram of a machine in an example form of a computing system within which a set of instructions for causing the machine to perform any one or more of the methodologies discussed herein may be executed.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit WIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alpha-numeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920. In some embodiments, the machine-readable medium 922 may be a machine-readable device.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   causing, by one or more processors of a media device, a graphical user interface to be presented on a display, the graphical user interface comprising a plurality of rows of thumbnails, each row of thumbnails on the plurality of rows of thumbnails representing a set of media items in a plurality of media items, each thumbnail positioned in its corresponding row of thumbnails of the plurality of rows of thumbnails according to a start time of a media item associated with each thumbnail, each row of thumbnails in the plurality of rows of thumbnails allowing navigation along a time axis independent of other rows of thumbnails of the plurality of rows of thumbnails, the navigation for each row of thumbnails in the plurality of rows of thumbnails enabled based on an input corresponding to an interaction, received via a touchscreen, with the row of thumbnails, the navigation for each row of thumbnails in the plurality of rows of thumbnails being based on a navigable direction indicated by the interaction;
   responsive to receiving at least one input corresponding to one or more interactions, detecting that the at least one input causes a realignment of one or more rows of thumbnails allowing navigation independently along the time axis, the at least one input causing the one or more rows of thumbnails to realign according to at least two program information categories;
   realigning, based on the detecting that the at least one input causes the realignment, the one or more rows of thumbnails on the graphical user interface according to the at least two program information categories; and
   causing display of an updated graphical user interface with the realigned one or more rows of thumbnails based on the at least one input.

2. The method of claim 1, wherein the at least two program information categories comprise a time and a genre.

3. The method of claim 1, wherein the at least two program information categories comprise a time and a meta-tag category.

4. The method of claim 1, wherein the at least two program information categories comprise a time and a theme.

5. The method of claim 1, wherein the at least two program information categories comprises two selections from the group consisting of a time, a genre, favorites, a theme, a particular actor, popularity, relevance, and social connection programming.

6. The method of claim 1, wherein the at least two program information categories comprise a time, a genre, favorites, a theme, a particular actor, popularity, relevance, or social connection programming.

7. The method of claim 1, wherein the realigning comprises visually scrolling each visible row of the graphical user interface to their realigned position on the updated graphical user interface at a speed that results in all visible rows reaching their realigned position at a same time.

8. The method of claim 1, wherein the at least one input comprises one or more of a scrolling input performed to a row of the thumbnails, a drag and drop of an icon onto a thumbnail, a selection of an icon or button, or a selection from a drop down menu.

9. The method of claim 1, wherein the media items are broadcast programs that each start at a predetermined time.

10. A system comprising:
one or more hardware processors; and
a storage device storing instructions that, when executed by the one or more hardware processors, causes the one or more hardware processors to perform operations comprising:
causing a graphical user interface to be presented on a display, the graphical user interface comprising a plurality of rows of thumbnails, each row of thumbnails on the plurality of rows of thumbnails representing a set of media items in a plurality of media items, each thumbnail positioned in its corresponding row of thumbnails of the plurality of rows of thumbnails according to a start time of a media item associated with the thumbnail, each row of thumbnails in the plurality of rows of thumbnails allowing navigation along a time axis independent of other rows of thumbnails of the plurality of rows of thumbnails, the navigation for each row of thumbnails in the plurality of rows of thumbnails enabled based on an input corresponding to an interaction, received via a touchscreen, with the row of thumbnails, the navigation for each row of thumbnails in the plurality of rows of thumbnails being based on a navigable direction indicated by the interaction;
responsive to receiving at least one input corresponding to one or more interactions, detecting that the at least one input causes a realignment of one or more rows of thumbnails allowing navigation independently along the time axis, the at least one input causing the one or more rows of thumbnails to realign according to at least two program information categories;
realigning, based on the detecting that the at least one input causes the realignment, the one or more rows of thumbnails on the graphical user interface according to the at least two program information categories; and
causing display of an updated graphical user interface with the realigned one or more rows of thumbnails based on the at least one input.

11. The method of claim 1, wherein the at least one input comprises a drag and drop of a tag icon onto a thumbnail that triggers a determination of programs that have a matching meta-tag as that of a program corresponding to the thumbnail on which the tag icon was dropped.

12. The method of claim 1, wherein the realigning realigns more than one row of thumbnails, the realigning comprises:
calculating a speed of realignment for each visible row of the more than one row of thumbnails that results in all visible rows reaching their realigned position at a same time, the speed of realignment being based on a distance current information is from a final realigned position for each visible row; and
visually scrolling each visible row of the graphical user interface to their final realigned position on the updated graphical user interface at their respective calculated speed of realignment.

13. The method of claim 1, wherein the realigning realigns more than one row of thumbnails, the realigning comprises visually scrolling each visible row of the more than one row of thumbnails to their final realigned position on an updated graphical user interface such that all visible rows reach their realigned position at a same time.

14. The system of claim 10, wherein the at least two program information categories comprise a time and a genre.

15. The system of claim 10, wherein the at least two program information categories comprise a time and a meta-tag category.

16. The system of claim 10, wherein the at least two program information categories comprise a time and a theme.

17. The system of claim 10, wherein the at least two program information categories comprises two selections from the group consisting of a time, a genre, favorites, a theme, a particular actor, popularity, relevance, and social connection programming.

18. A machine-readable storage device storing instructions that, when executed by one or more processors of a machine, cause the machine to perform operations comprising:
causing a graphical user interface to be presented on a display, the graphical user interface comprising a plurality of rows of thumbnails, each row of thumbnails on the plurality of rows of thumbnails representing a set of media items in a plurality of media items, each thumbnail positioned in its corresponding row of thumbnails of the plurality of rows of thumbnails according to a start time of a media item associated with the thumbnail, each row of thumbnails in the plurality of rows of thumbnails allowing navigation along a time axis independent of other rows of thumbnails of the plurality of rows of thumbnails, the navigation for each row of thumbnails in the plurality of rows of thumbnails enabled based on an input corresponding to an interaction, received via a touchscreen, with the row of thumbnails, the navigation for each row of thumbnails in the plurality of rows of thumbnails being based on a navigable direction indicated by the interaction;
responsive to receiving at least one input corresponding to one or more interactions, detecting that the at least one input causes a realignment of one or more rows of thumbnails allowing navigation independently along the time axis, the at least one input causing the one or more rows of thumbnails to realign according to at least two program information categories;
realigning, based on the detecting that the at least one input causes the realignment, the one or more rows of thumbnails on the graphical user interface according to the at least two program information categories; and
causing display of an updated graphical user interface with the realigned one or more rows of thumbnails based on the at least one input.

19. The machine-readable storage device of claim 18, wherein the at least two program information categories comprises two selections from the group consisting of a time, a genre, favorites, a theme, a particular actor, popularity, relevance; and social connection programming.

20. The machine-readable storage device of claim 18, wherein the realigning comprises visually scrolling each visible row of the graphical user interface to their realigned position on the updated graphical user interface at a speed that results in all visible rows reaching their realigned position at a same time.

* * * * *

UNITED STATES PATENT AND TRADEMARK OFFICE
CERTIFICATE OF CORRECTION

PATENT NO. : 10,063,930 B2  
APPLICATION NO. : 15/130002  
DATED : August 28, 2018  
INVENTOR(S) : Chai et al.

Page 1 of 1

It is certified that error appears in the above-identified patent and that said Letters Patent is hereby corrected as shown below:

On the Title Page

In item (71), in "Applicant", in Column 1, Line 1, delete "inc.," and insert --Inc.,-- therefor In item (30), in "Foreign Application Priority Data", in Column 1, Line 1, delete "11188362" and insert --11188362.5-- therefor On page 3, in Column 2, under "Other Publications", Line 8, delete "Examimer" and insert --Examiner-- therefor In the Specification In Column 1, Line 15, delete "EP11188362," and insert --EP11188362.5,-- therefor In the Claims In Column 16, Line 58, in Claim 19, delete "relevance; and" and insert --relevance, and-- therefor Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*